United States Patent [19]

Collins et al.

[11] 4,060,909
[45] Dec. 6, 1977

[54] SURVEYING ROD

[76] Inventors: Eugene C. Collins, East Star Rte. Box 196; Stephen E. Collins, Rte. 1 Box 39; David N. Collins, 621 W. 15th St., all of Portales, N. Mex. 88130

[21] Appl. No.: 663,291

[22] Filed: Mar. 2, 1976

Related U.S. Application Data

[63] Continuation of Ser. No. 554,989, March 3, 1975, abandoned.

[51] Int. Cl.² ............................................. G01C 15/06
[52] U.S. Cl. .................................................. 33/296
[58] Field of Search ................... 33/293, 294, 295, 296

[56] References Cited

U.S. PATENT DOCUMENTS

| 861,929 | 7/1907 | Wulff | 33/296 |
|---|---|---|---|
| 894,955 | 8/1908 | Jones | 33/294 |
| 1,220,358 | 3/1917 | Martin | 33/294 |
| 1,450,360 | 4/1923 | Effertz | 33/294 |
| 2,818,653 | 1/1958 | Henderson | 33/294 |

*Primary Examiner*—Steven L. Stephan
*Attorney, Agent, or Firm*—Mason, Fenwick & Lawrence

[57] ABSTRACT

A telescoping surveying rod is disclosed having an adjustable support member to permit direct reading from a reference elevation such as zero elevation or from a one hundred foot elevation when the rod is used as a standard rod for elevation or for excavation; the rod includes dual scales lineated for tenths of a foot and for inches to permit direct reading of either without necessitating any conversion.

3 Claims, 8 Drawing Figures

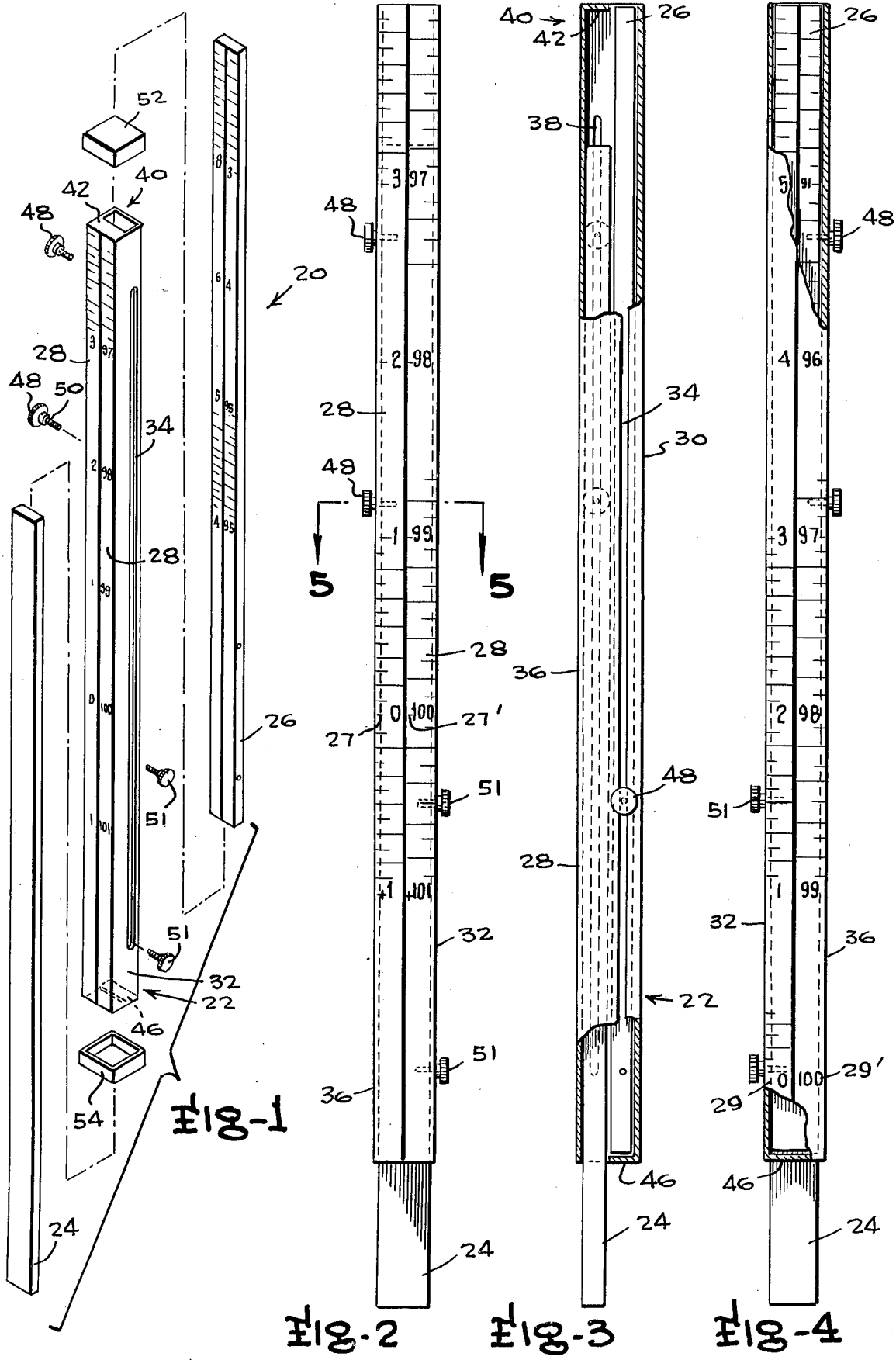

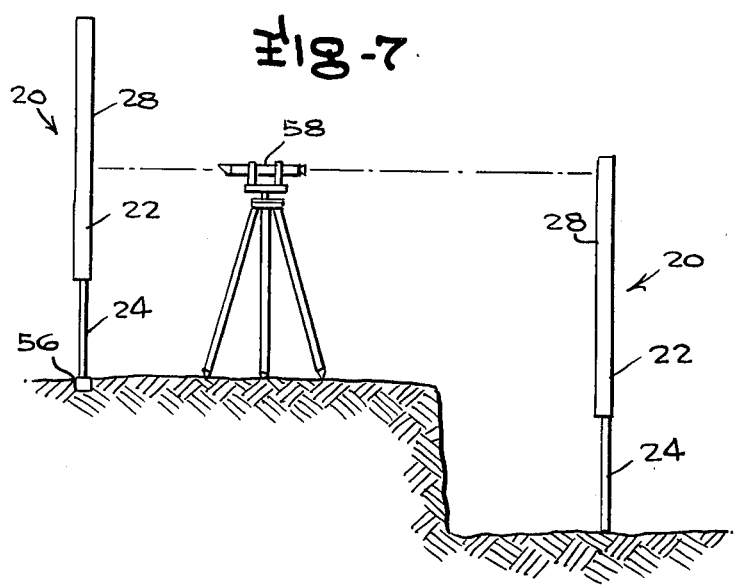
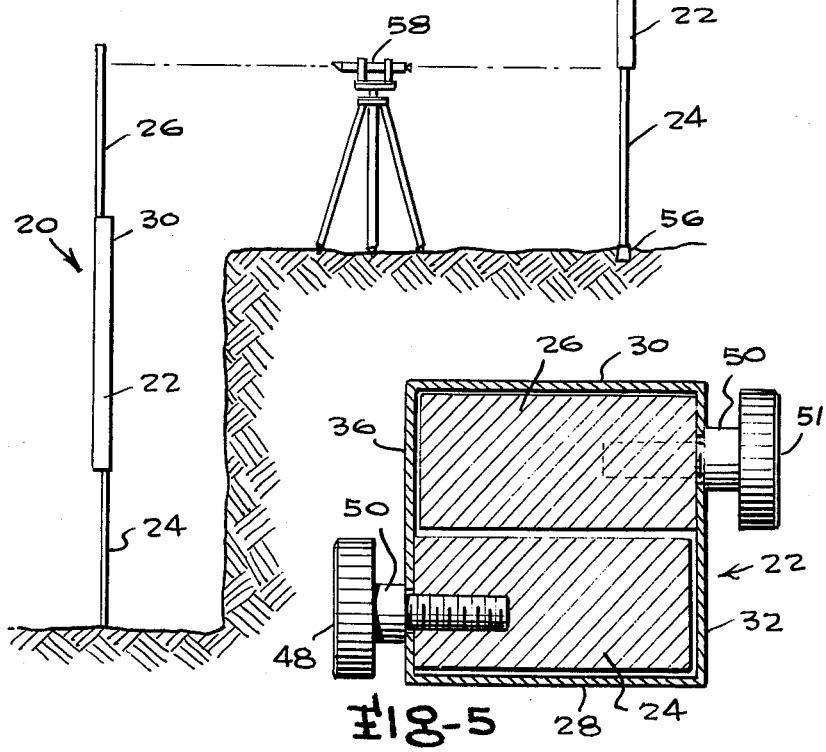
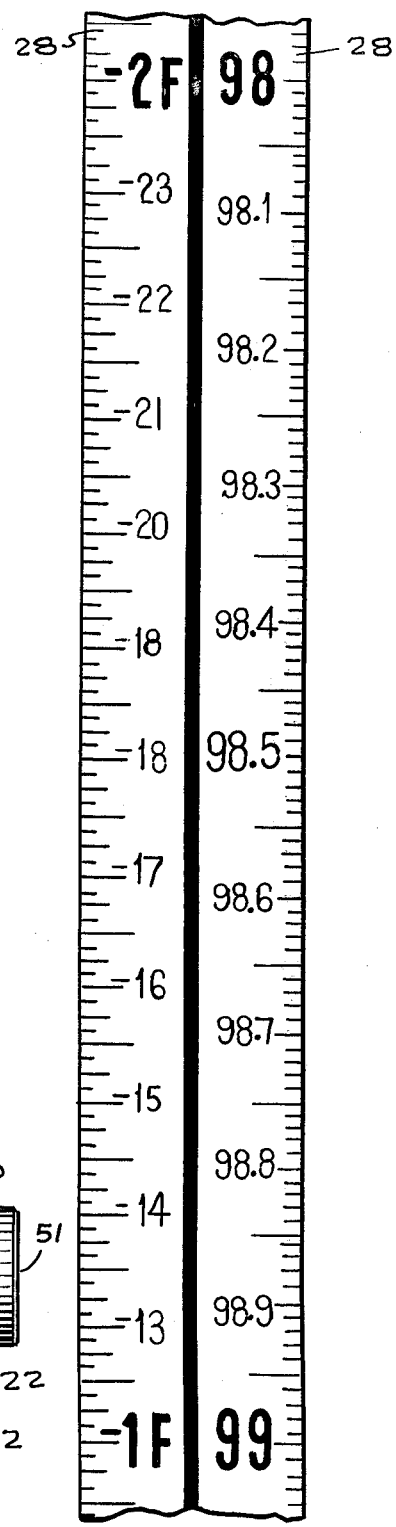

SURVEYING ROD

This is a continuation of application Ser. No. 554,989, filed Mar. 3, 1975, and now abandoned.

This invention relates to surveying rods and more specifically to a surveying rod which can be adjusted to position a desired reference mark on its scale at the same elevation as the transit sight level.

Since the conventional surveying rod is normally employed to measure differences in elevation from a reference level which is different from the transit sight level, it has been necessary to subtract the reference level (which is always below the line of sight of the transit) from the surveying rod reading to determine the elevation at any other location. For example, if a basement excavation is to be dug 10 feet below a certain reference point, the surveyor will read the scale on the surveying rod when it is positioned on the reference point and then subtract that reading from the reading taken at any other level such as 10 feet lower for the floor level of the basement.

A major difficulty with the existing surveying rods, especially for relatively inexperienced surveyors, is the opportunity for error resulting from the necessity of recording and subtracting the height above the reference point to the transit level. Occasionally a surveyor, in the rush of getting his job completed or through momentary inattentiveness, will incorrectly record the reference elevation height to be later subtracted or will make an error when the subtraction is attempted thereby resulting in incorrect elevation stakes such as placing the floor in the excavation at a wrong elevation or positioning a single stake or group of stakes at an incorrect elevation. The human error in recording and subtracting the reference elevation from the elevation measured at the desired point has resulted in the great and substantial losses in the repair of structures built to incorrect elevations.

An additional difficulty with previous surveying rods is the possibility of error in converting between inches and tenths of feet or centimeters. With the increased use of the metric system throughout the world, these conversion errors will increase if conventional surveying rods are used.

In summary, the previous surveying method has been relatively slow and cumbersome because of the requirement for continuously subtracting the height from the transit sight level to the reference level from all subsequent readings on the surveying rod and because of the necessity for converting from inches to tenths of feet or vice versa.

Therefore, it is the primary object of this invention to provide a new and improved surveying rod.

It is another object of this invention to provide a new and improved surveying rod which can be read directly without subtracting any reference heights to get the necessary elevation or excavation.

An additional object of the present invention is to provide a surveying rod which has tenths of feet and inches on the same scale to permit direct reading by the surveyor without requiring any mathematical or tabular conversion.

A further object of the present invention is the provision of a surveying rod which may be adjusted to a reference level, such as the one hundred foot elevation or the zero elevation, at the height of the transit.

An additional object of the present invention is to provide a surveying rod having a scale on one side adapted for the surveying of footings, grade stakes, etc. and a scale on the opposite side adapted for the surveying of excavations such as swimming pools, basements, etc.

Another object of the present invention is to provide a surveying rod which is more efficient and less time consuming than prior known surveying rods and which may be utilized by less skilled surveyors while improving the overall accuracy of the surveying question.

A still further object of the present invention is to provide a surveying rod which permits direct reading of feet and inches and meters and centimeters on the same scale.

Achievement of the objects of this invention is enabled through the provision of a telescoping support member which extends downwardly from a scale member and is of sufficient length to rest on a reference level which may be a stake in the ground, a foundation or the like. The scale member, which is read directly by the surveyor through the transit, is slidable upwardly to position a predetermined mark on the scale member such as the zero mark or the one hundred foot mark at the level of the transit sight. A clamping device is provided to fix the telescoping support member to the scale member thereby providing a reference scale reading at the transit sight level which does not require the subtraction of the height from the reference level to the transit sight level when making subsequent readings on the scale. Dual scales including inch markings on one edge of the face of the scale and tenth of a foot markings on the opposite edge are provided on the scale member. One side of the scale may have markings from zero to any desired height such as 10 feet and the opposite side of the scale may have a center marking of 100 feet with the adjacent markings below the center marking increasing to higher elevations such as 105 feet and above the center marking decreasing to lower elevations such as 95 feet. The opposite sides of the scale so marked may have inch and tenths of foot scales as previously described. The scale portion of the present invention may have an upwardly telescoping auxiliary scale portion which may be extended above a main scale portion and clamped in position to provide a surveying rod with a longer scale such as ten feet while retaining the convenience of a shorter surveying rod.

A better understanding of the manner in which the preferred embodiment of the subject invention achieves the objects of the invention will be enabled when the following written description is read in conjunction with the appended drawings in which:

FIG. 1 is an exploded perspective view of the preferred embodiment of the present invention;

FIG. 2 is a front view of the preferred embodiment of the present invention showing the telescoping foot member partially extended;

FIG. 3 is a fragmentary side view of the preferred embodiment shown in FIG. 1 with the telescoping foot member partially extended as shown in FIG. 2 and with the auxiliary scale member fully retracted;

FIG. 4 is a fragmentary back view of the preferred embodiment shown in FIG. 1 with the telescoping foot member partially extended as shown in FIGS. 2 and 3 and with the auxiliary scale member fully retracted as shown in FIGS. 2 and 3;

FIG. 5 is a sectional view of the preferred embodiment taken along line 5—5 of FIG. 2;

FIG. 6 is a fragmentary view of the front scale in FIG. 2 showing the dual scales marked in inches and in tenths of feet;

FIG. 7 shows the preferred embodiment being used to measure elevations about a reference elevation such as a 100 foot mark on the surveying rod with the reference level being set with the rod as positioned on the left of the figure and with the measured height being measured with the rod positioned as shown on the right of the figure; and FIG. 8 shows the preferred embodiment with the zero mark on the scale being set as a reference from the level as shown with the surveying rod at the right of the figure and with the depth of the excavation being measured with the surveying rod as shown on the left of the figure.

Turning first to FIG. 1, it will be seen that the surveying rod 20 includes a main scale body 22, a telescoping foot member 24, and a telescoping auxiliary scale member 26.

The main scale body 22 is a square elongated tube as particularly shown in FIGS. 1 and 5 and has a front scale surface 28 which is marked with the scales for measuring elevation with respect to the zero reference 27 or the 100 foot reference 27' and a back scale surface 30 marked with a scale for measuring the depth of an excavation from the zero reference level 29 or from the 100 foot level 29' as shown in FIG. 4.

A first side surface 32 of the main scale body 22 has an auxiliary scale elongated slot 34 which extends parallel to and adjacent the front and back scale surfaces 28 and 30. A second side surface 36 of the main scale body 22 has an elongated foot slot 38 as shown in FIG. 3 extending adjacent the front scale surface 28 of the main scale body. An upper end 40 of the main scale body has an auxiliary scale guideplate 42 closing off approximately the front half of the upper end of the square tube forming the main scale body 22 and the lower end 44 of the main scale body is similarly partially closed by the foot guideplate 46.

The telescoping foot member 24 is of rectangular cross section, slightly smaller than half of the square opening within the tubular main scale body 22 and is slightly shorter than the overall length of the main scale body. It is preferably formed of wood for improved rigidity and reduced weight to produce a strong and yet lightweight surveying rod. The telescoping foot member 24 is retained within the main scale body 22 as shown in the various figures by set screws 48 which are threaded into the telescoping foot member through the elongated foot slot 38 and are spaced apart near the upper end of the telescoping foot member to permit the foot member to be extended downwardly past the foot guideplate 46 and below the main scale body as far as is necessary to permit the positioning of the desired reference point on the front scale surface 28 or the back scale surface 30 at the transit sight level as desired depending on whether elevations or excavations are being measured.

The set screws 48 have shoulders 50 as best shown in FIG. 5 which can be tightened against the side surface 36 of the main scale body to permit clamping of the telescoping foot member in a fixed position against the inner surface of the main scale body. The purpose of having two set screws spaced apart on the telescoping foot member is to provide a rigid joint between the foot member and the main scale body to achieve and maintain the necessary accuracy for leveling and surveying; however, close tolerances on the various parts would permit the use of a single set screw. Other means of clamping the foot member to the main scale body could also be used.

The telescoping auxiliary scale member 26 is similar to the foot member in configuration and has two similar screws 51 which are identical to set screws 48 and are threaded into a side edge of the auxiliary scale member. Screws 51 are spaced apart and adjacent the lower end of the auxiliary scale member so that the auxiliary scale member is free to slide upwardly past the auxiliary scale guideplate 42 to extend above the main scale body. The auxiliary scale member has front and rear scales which enable an extension of the front scale surface 28 and the back scale surface 30 of the main scale body. Consequently, the length of the effective scale on the surveying rod when the telescoping auxiliary scale member is fully extended above the main scale body is substantially increased.

A top dust cover 52 and a bottom dust cover 54, which are formed of a plastic material, are pressed over the upper and lower ends of the main scale body when the foot member and the auxiliary scale member are in the fully retracted position to prevent damage to the surveying rod when it is being transported or stored.

The various components of the surveying rod may be formed of metal, plastic, or wood as desired to achieve the necessary accuracy and useful life of the device.

The dual scales on front scale surface 28 are marked in inches and tenths of feet, as shown particularly in FIG. 6, to permit the direct conversion from feet and inches to tenths of feet and vice versa without the necessity of calculations or reference to conversion tables.

The present invention may be used for establishing elevations, as shown in FIG. 7, by placing the foot member 24 on a reference elevation such as marker 56 and raising the main scale body 22 until the cross hairs on the transit sight 58 are aligned with the zero mark 27 or 100 foot mark 27' on the front scale surface 28. The surveying rod may then be moved to a location where the elevation is desired such as is shown in the position at the right on FIG. 7. The transit sight 58, when rotated and focused on the scale, will read the elevation of that particular point with respect to marker 56. Previously the height from the marker 56 up to the line of sight of the transit was measured and then subtracted from the height measured at the desired location to determine the change in elevation from marker 56 to the desired location. If the desired location were lower than could be read on the main scale body, the auxiliary scale member could then be raised to the fully extended position thereby increasing the range of lower elevations which could be measured with the surveying rod.

If the depth of an excavation such as the basement or swimming pool is desired, as exemplified by FIG. 8, the surveying rod would be positioned on the reference marker 56 which may be a stake or any other reference level with the back scale surface 30 facing the transit sight. The foot member is then extended to position the zero elevation 29 of the back scale surface 30 at the sight level. When the surveying rod is positioned in the excavation as shown at the left of FIG. 8 with the back scale surface facing the transit sight and the auxiliary scale member fully extended, the surveyor sighting through the transit sight 58 will read the depth of the excavation. Previously, it has been necessary to subtract the height from the transit sight level to the marker 56 from the height of the transit sight level above the desired location in the excavation because the zero elevation mark on the surveying rod was positioned on the marker 56.

This invention significantly reduces the possibility of errors which exist with the present surveying rods and will permit the use of less skilled workmen to achieve superior results.

It is to be understood that numerous modifications of the disclosed embodiment of the subject invention such as marking all or part of the scales in metric measure will undoubtedly occur to those of skill in the art and the spirit and scope of the invention is to be limited solely in light of the appended claims.

We claim:

1. A surveying rod which permits direct reading from first and second predetermined reference elevation marks comprising a main elongated scale body having a front surface with a first dual scale including two graduated scales positioned adjacent each other on the front surface thereof, said first dual scale having a first zero reference mark on one of said two graduated scales on the first dual scale and the first predetermined reference mark on the other of said two graduated scales on said first dual scale with said first zero reference mark and said first predetermined reference mark positioned adjacent a lower end of the main scale body, said main scale body having a back surface with a second dual scale including two graduated scales positioned adjacent each other in the back surface thereof, said second dual scale having a second zero reference mark on one of said two graduated scales on the second dual scale and the second predetermined reference mark on the other of said two graduated scales on said second dual scale with said second zero reference mark and said second predetermined reference mark positioned centrally of the main scale body, and adjustable support means connected to the main scale body for positioning said first zero reference mark on the main scale body in visible locations adjacent a lower edge of the support means and at predetermined heights above the lower edge of the support means wherein the main scale body is an elongated tube open at both ends and has a first elongated slot on one side of the main scale body and wherein the support means comprises an elongated foot member slidable within the main scale body and a locking means attached to the foot member and slidable within the first elongated slot for locking the support member in any desired position.

2. A surveying rod which permits direct reading from first and second predetermined reference elevation marks comprising a main elongated scale body having a front surface with a first dual scale including two graduated scales positioned adjacent each other on the front surface thereof, said first dual scale having a first zero reference mark on one of said two graduated scales on the first dual scale and the first predetermined reference mark on the other of said two graduated scales on said first dual scale with said first zero reference mark and said first predetermined reference mark positioned adjacent a lower end of the main scale body, said main scale body having a back surface with a second dual scale including two graduated scales positioned adjacent each other in the back surface thereof, said second dual scale having a second zero reference mark on one of said two graduated scales on the second dual scale and the second predetermined reference mark on the other of said two graduated scales on said second dual scale with said second zero reference mark and said second predetermined reference mark positioned centrally of the main scale body, adjustable support means connected to the main scale body for positioning said first zero reference mark on the main scale body in visible locations adjacent a lower edge of the support means and at predetermined heights above the lower edge of the support means and telescoping scale means extendable upwardly from the main scale body and including means for locking the telescoping scale means in position for providing additional graduations to the first and second scales on the main scale body thereby increasing the useful range of the rod, the main scale body includes an elongated tube open at both ends and a first elongated slot on one side of the main scale body adjacent the rear surface and a second elongated slot on the opposite side adjacent the front scale surface of the main scale body, the support means comprises an elongated foot member slidable within the main scale body and a first locking means attached to the foot member and slidable within the first elongated slot for locking the support in any desired position, and the telescoping scale means is slidable within the main scale body adjacent the support foot and has a second locking means insertable through said elongated slot for locking the telescoping scale means on both the front surface and the back surface of the main scale body.

3. A surveying rod which permits direct reading from first and second predetermined reference elevation marks comprising a main elongated scale body having a front surface with a first dual scale including two graduated scales positioned adjacent each other on the front surface thereof, said first dual scale having a first zero reference mark on one of said two graduated scales on the first dual scale and the first predetermined reference mark on the other of said two graduated scales on said first dual scale with said first zero reference mark and said first predetermined reference mark positioned adjacent a lower end of the main scale body, said main scale body having a back surface with a second dual scale including two graduated scales positioned adjacent each other in the back surface thereof, said second dual scale having a second zero reference mark on one of said two graduated scales on the second dual scale and the second predetermined reference mark on the other of said two graduated scales on said second dual scale with said second zero reference mark and said second predetermined reference mark positioned centrally of the main scale body, and adjustable support means connected to the main scale body for positioning said first zero reference mark on the main scale body in visible locations adjacent a lower edge of the support means and at predetermined heights above the lower edge of the support means, one of the scales on each of the first dual scale and the second dual scale is graduated in units of tenths of feet and the other scale on each of the dual scales is graduated in units of inches, the main scale body is an elongated tube open at both ends and has a first elongated slot on one side of the main scale body and the support means comprises an elongated foot member slidable within the main scale body with a locking means attached to the foot member and slidable within the first elongated slot to lock the support member in any desired position.

* * * * *